US011237853B2

(12) United States Patent
Banne

(10) Patent No.: US 11,237,853 B2
(45) Date of Patent: Feb. 1, 2022

(54) SYSTEMS AND/OR METHODS FOR COMPUTER-AUTOMATED EXECUTION OF DIGITIZED NATURAL LANGUAGE VIDEO STREAM INSTRUCTIONS

(71) Applicant: Software AG, Darmstadt (DE)

(72) Inventor: Abhinandan Ganapati Banne, Belgaum (IN)

(73) Assignee: Software AG, Darmstadt (DE)

( * ) Notice: Subject to any disclaimer, the term of this patent is extended or adjusted under 35 U.S.C. 154(b) by 0 days.

(21) Appl. No.: 17/174,706

(22) Filed: Feb. 12, 2021

(65) Prior Publication Data

US 2021/0165671 A1   Jun. 3, 2021

Related U.S. Application Data

(62) Division of application No. 16/419,688, filed on May 22, 2019, now Pat. No. 10,956,181.

(51) Int. Cl.
*G06F 3/048* (2013.01)
*G06F 9/451* (2018.01)
*G06F 8/38* (2018.01)
*G10L 15/26* (2006.01)

(52) U.S. Cl.
CPC ............... *G06F 9/451* (2018.02); *G06F 8/38* (2013.01); *G10L 15/26* (2013.01)

(58) Field of Classification Search
None
See application file for complete search history.

(56) References Cited

U.S. PATENT DOCUMENTS

| | | |
|---|---|---|
| 4,491,960 A | 1/1985 | Brown |
| 5,251,268 A | 10/1993 | Colley et al. |
| 5,337,372 A | 8/1994 | Lecun et al. |
| 5,729,630 A | 3/1998 | Ikeda |
| 6,320,597 B1 | 11/2001 | Ieperen |
| 7,171,056 B2 | 1/2007 | Zhang et al. |

(Continued)

OTHER PUBLICATIONS

About the System Activities, retrieved May 22, 2019, 1 page. https://activities.uipath.com/docs.

(Continued)

*Primary Examiner* — Claudia Dragoescu
(74) *Attorney, Agent, or Firm* — Nixon & Vanderhye PC

(57) ABSTRACT

Techniques for auto-executing instructions provided in a video on a computing platform are provided. A script is developed from audio provided in the video. Text shown in frames of the video is extracted. Simulated user interaction (UI) events present in the video are identified. A timeline representation is generated to include entries for elements of the script and the extracted text, and identified UI events. Like elements are collected into common entries. Each entry in the script that lacks an associated UI event but is likely to involve a user action prompt is identified. Each entry having an associated identified UI event, and each entry identified as likely to involve a user action prompt, is converted into a corresponding user action command representation. Each user action command representation is mapped to a computing platform executable command, each being performed using processing resources of the computing platform, automatically, without user intervention.

22 Claims, 10 Drawing Sheets

(56) References Cited

U.S. PATENT DOCUMENTS

| | | | |
|---|---|---|---|
| 9,558,467 B1 | 1/2017 | Simon et al. | |
| 10,593,325 B2 | 3/2020 | Hazarika et al. | |
| 2008/0162561 A1 | 7/2008 | Naphade | |
| 2009/0016600 A1* | 1/2009 | Eaton | G06N 3/08 382/159 |
| 2013/0110940 A1* | 5/2013 | Pasquero | G06F 3/0488 709/206 |
| 2013/0166303 A1 | 6/2013 | Chang | |
| 2014/0245152 A1* | 8/2014 | Carter | G09B 5/02 715/720 |
| 2015/0103131 A1* | 4/2015 | Denoue | H04N 7/147 348/14.03 |
| 2016/0151918 A1* | 6/2016 | Stoyanchev | G06F 40/30 700/246 |
| 2016/0328384 A1* | 11/2016 | Divakaran | G06F 40/169 |
| 2017/0346769 A1* | 11/2017 | McCray | G06F 40/30 |
| 2018/0113577 A1* | 4/2018 | Burns | H04N 21/4223 |
| 2018/0232592 A1* | 8/2018 | Stewart | G08B 13/19606 |
| 2018/0307383 A1* | 10/2018 | Faulkner | H04L 12/1831 |
| 2020/0371818 A1 | 11/2020 | Banne | |

OTHER PUBLICATIONS

The Windows Installer, retrieved May 22, 2019, 17 pages. https://orchestrator.uipath.com/docs/the-windows-installer.

Wikipedia—Frame Rate, retrieved May 22, 2019, 5 pages. https://en.wikipedia.org/wiki/Frame_rate.

Create and Run PowerShell Scripts from the Configuration Manager Console, retrieved May 22, 2019, 17 pages. https://docs.microsoft.com/en-us/sccm/apps/deploy-use/create-deploy-scripts.

OpenCV—About, retrieved May 22, 2019, 8 pages. https://opencv.org/about/.

Trint, retrieved May 22, 2019, 9 pages. https://trint.com/how-it-works/.

Wikipedia—Robotic Process Automation, retrieved May 22, 2019, 5 pages. https://en.wikipedia.org/wiki/Robotic_process_automation.

Wikipedia—OpenCV, retrieved Mar. 1, 2016, 4 pages. https://en.wikipedia.org/wiki/OpenCV.

OpenCV—AI Courses by OpenCV, retrieved Mar. 1, 2016, 1 page. http://opencv.org/.

Wikipedia—Tesseract (software), retrieved Mar. 1, 2016, 4 pages. https://en.wikipedia.org/wiki/Tesseract_%28software%29.

Post-it Plus App, retrieved Mar. 1, 2016, 6 pages. http://www.post-it.com/3M/en_US/post-it/ideas/plus-app/?WT.mc_id=www.post-it.com/app.

Simbio: Product-Portfolio, retrieved Mar. 2, 2016, 4 pages. http://www.symbioworld.com/en/product/product-portfolio.html.

Prabhu et al. "Whiteboard documentation through foreground object detection and stroke classification," Oct. 2008, IEEE, pp. 336-340.

NLTK 3.2.5 Documentation, "Natural Language Toolkit," retrieved Apr. 12, 2018, 2 pages. https://www.nltk.org/.

* cited by examiner

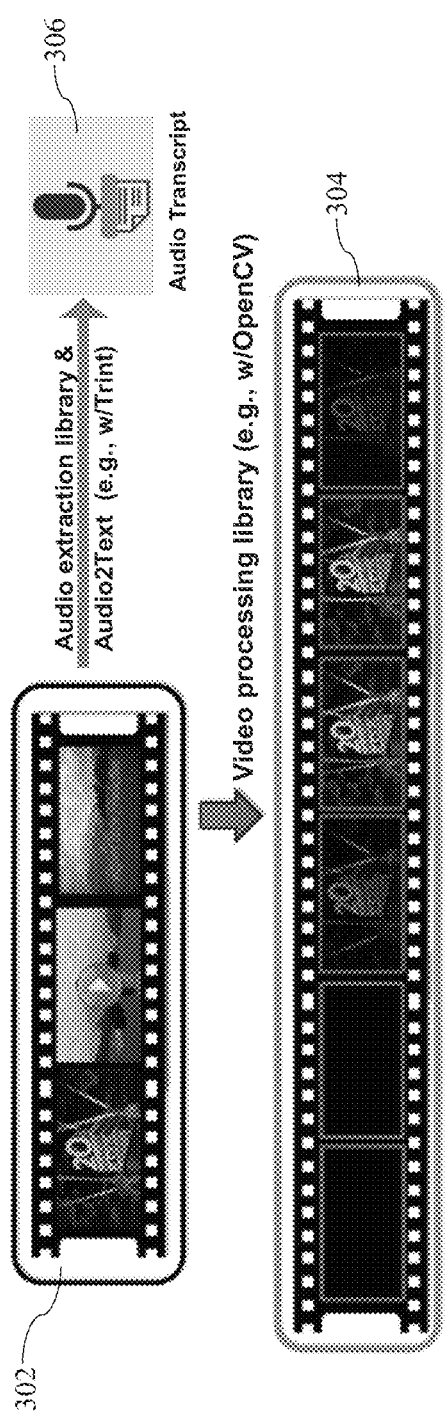

```
videoCap.open(input);

int video_length = (int) videoCap.get(Videoio.CAP_PROP_FRAME_COUNT);
int frames_per_second = (int) videoCap.get(Videoio.CAP_PROP_FPS);
// int frame_number = (int) cap.get(Videoio.CAP_PROP_POS_FRAMES);
Mat currentFrame = new Mat();
Mat previousFrame = new Mat();
Mat diffFrame = new Mat();

int frame_number = 0;
Mat previousImage = new Mat();
if (videoCap.isOpened()) {
    while (videoCap.read(currentFrame)) {
        // this is done to get 2 FPS, else default is 30FPS
        int frameId = (int) videoCap.get(1);
        if (frameId % 5 == 0) {
            Imgcodecs.imwrite(output + "/" + frame_number + ".jpg", currentFrame);
```

Fig. 10

```
Core.subtract(currentFrame, previousFrame, diffFrame);
Imgcodecs.imwrite(diffFrames + "/" + frame_number + ".jpg", diffFrame);

// run code to match the mouse pointer
MatchPointerTemplate matchTemplate = new MatchPointerTemplate();
matchTemplate.run(new String[] { diffFrames + "\\" + String.valueOf(frame_number) + ".jpg",
    pointerMaskTemplate, null, output + "\\" + frame_number + ".jpg" });
```

Fig. 11

```
String resultText = tessOCR
    .getText(MatchPointerTemplate.outputForTessrect + "/" + frame_number + "mouseArea.jpg");
if (resultText != null) {
    // System.out.println("\nResult word: " + resultText);
    resultText = resultText
        .replaceAll("[^\\-\\+\\^,.*\\\\\\(\\ $ \\& \\%]", "");
    // Inspect returns 1 as |, replace that
    resultText = resultText.replaceAll("\\|", "1");
    detectedText.put(frame_number, resultText);
}
}
```

Fig. 12

```
if(currentUserInteraction == mouseAction.DOUBLECLICK) {
    execCmd.executeCommands(new String[] { finalDetectedText });
}
```

Fig. 13

SYSTEMS AND/OR METHODS FOR COMPUTER-AUTOMATED EXECUTION OF DIGITIZED NATURAL LANGUAGE VIDEO STREAM INSTRUCTIONS

CROSS-REFERENCES TO RELATED APPLICATIONS

This application is a divisional of U.S. application Ser. No. 16/419,688, filed May 22, 2019, the disclosure of which is hereby incorporated herein by reference in its entirety.

TECHNICAL FIELD

Certain example embodiments described herein relate to techniques for generating enterprise models that are at least partially self-executing within a computing environment. More particularly, certain example embodiments described herein relate to systems and/or methods that implement a user-interactive approach to transforming into a formalized, computerized, at least partially self-executing enterprise model usable with an enterprise modeling system, spontaneous, unstructured and/or loosely-structured natural language content that is captured from a video, audio, and/or text source and includes semantic concepts recognizable from a general model grammar and/or one or more extensible, hierarchically arrangeable domain-related grammars.

BACKGROUND AND SUMMARY

Enterprises create content to communicate to customers, showcase their products, provide demos to customers, train customers to install and/or use products, etc. This content can be shared with the final consumer of content via the Internet, a local or global repository, or the like. Oftentimes, the content shared will involve video, audio, and/or text that describes and defines structures, processes, information, and/or resources usable in connection with a computing system, software tool, and/or the like, for one of the above-described and/or other purposes. Such content, oftentimes in video form, may have graphical representations that generally are composed from a set of predefined actions and connection types that apply with respect to the resources in order to do something with the computing system, software tool, etc. Video and text oftentimes will highlight different types of resources, and audio instructions may be provided to further describe what the resources are, how they can be used, etc., when trying to perform a particular task.

There are some commercially available software tools that support enterprises in setting up products, fixing issues, etc., using scripting. These tools generally focus on a particular product and typically do not apply to a broad range of products, computing platforms, problem types, etc. For instance, software maintenance tools such as Microsoft Configuration Manager provide a specific type of maintenance for a specific type of product being used in a specific computing environment and do not necessarily offer a broad spectrum of functionalities for a single product, much less multiple different products potentially usable on different platform types.

When scripts are not available and a user wants to try to fix an issue with a computer or computer software, perform maintenance, install new software, perform a particular task that the user might not be familiar with (e.g., because the user has not done it before or has only done it a few times), or the like, the user might turn to content such as that discussed above. For example, a user might start by watching a video of the product being used, reading through product specifications, perusing readme text file details, etc. Other users will watch instructional or "how to" videos. Still other users might try to simply muddle through the process, unaided by the above and/or other potential sources of help. For those users who do seek help, gathering the information needed can be simple in some instances, e.g., if the provider makes available relevant content that is easily searchable. In other instances, users may experience difficulties searching for and locating the instructional content. For instance, many computer users today have difficulties searching for, and subsequently implementing, instructions on how to remove computer viruses, spyware, and/or the like.

When scripts are not available, provider-led discussions of how to install or fix software, perform a task, or the like, may take place. For instance, technical support lines, chat bots, and/or the like are known to be used for these purposes. This kind of "live assist" may allow end-users to set up or fix products, or perform specific tasks, quickly and interactively, without requiring users to struggle with "how to" type instructions.

Many of these discussions occur from remote locations or in meetings. The results of these discussions and remote meetings may be documented via video, audio, whiteboards, flipcharts, notes, and/or the like. For instance, many people are familiar with the automated prompt stating that calls may be recorded for quality and/or training purposes. A scripter may try to formalize information captured during such sessions for use in the future. At some point (e.g., once a review group is satisfied with the documented procedure, once the same issue has been documented a number of times and resolved in the same or similar way, etc.), the content created during the call/meeting, on the whiteboard or flipchart, etc., may be transferred into a modeling tool for scripting or other purposes. This transference unfortunately is a tedious task that typically is performed in a fully manual fashion. There accordingly is a substantial "media break" as between the creation of content, and the creation of a corresponding model via a software tool, and then again between the transference of this model into a script. These breaks unfortunately are disadvantageous in that manual transference processes oftentimes are error-prone, require redundant review exercises, sometimes produce low-quality results (e.g., if there is a lack of understanding in what was created in the real world, how what was created in the real world relates to the computer modeling tool's capabilities, how the computer modeling tool's capabilities translate into functionality available on different computing platforms, etc.), and so on. Thus, there unfortunately is a resource drain associated with these burdensome manual processes. The result still oftentimes is a script with limited power because it applies to a single problem or single problem set applicable to a specific product in connection with a specific computing environment.

Of course, these problems associated with the creation of scripts can be magnified when no physical artifacts are created from such work sessions. Such work sessions may be recorded (e.g., via a video conferring and/or collaboration system), but the same vagueness as noted above typically is even more pronounced. The process of watching video and/or listening to audio and trying to manually execute it is complicated by the tediousness of that approach, especially when the information is not cleaned, involves other users and/or technical support people, etc. Moreover, the person or persons creating the process from the recorded video may lack the contextual understanding to pick up on nuances, and/or may lack the technical acumen needed to execute it on system. Simply generating a script from live or pre-recorded video will not solve these issues. Indeed, having text that amounts to a transcript can be just as tedious to go through, and the accuracy of such text may not be good because the computer systems generating them, just like the individuals, may lack domain-related contextual and/or technical understandings relevant to the input and output. It may be difficult to determine what is being queried, what is being answered, who is speaking, how conditional statements can be put together from this information, how a resolution might relate to a particular computing environment or user-introduced issue, etc.

In other instances, this information will simply be captured in a "cleaner" or more streamlined set of audio, video, and/or textual instructions, which then has to be located and implemented by a user.

It will be appreciated that it would be desirable to overcome the above-identified and/or other problems. For example, it will be appreciated that it would be desirable to make instructional content available in a way that is understandable to and usable by to a wide audience, including users experiencing the same or related problems on different computing systems. In this regard, for example, it will be appreciated that it would be desirable provide instructions for installing software, repairing software or computing system issues, performing computer-implemented tasks, etc., while enabling many actions to be taken automatically by the computing system itself without requiring human intervention, despite there being multiple different potential issues, configurations, etc. Certain example embodiments proceed in these and/or other respects.

In certain example embodiments, a method of automating execution, on a computing platform, of digitized natural-language instructions provided in a video, is provided. A script is developed from audio provided in the video. Text shown visually in frames of the video is extracted. Simulated user interaction events present in the video are identified. A timeline representation that includes entries for elements of the developed script, elements of the extracted text, and identified simulated user interaction events is generated. Like elements of the developed script, elements of the extracted text, and/or identified simulated user interaction events are collected into common or linked entries in the timeline representation. Entries in the timeline are converted to corresponding user action command representations. Each user action command representation is mapped to a computing platform executable command. Elements of the developed script and/or elements of the extracted text are used as parameters for at least one of the corresponding user action command representations. Each computing platform executable command is stored for subsequent execution using processing resources of the computing platform, at least some of the computing platform executable commands being executable automatically and without user intervention.

According to certain example embodiments, each simulated user interaction event may be identified as having a type belonging to a group of predefined user interaction event types, e.g., with the group including click and double-click types.

According to certain example embodiments, user action prompts are provided for suspected download and run operations.

According to certain example embodiments, execution of the computing platform executable commands may be attempted in an order corresponding to counterpart entries in the timeline representation. In some cases, the attempted execution of the computing platform executable commands may be paused or otherwise at least temporarily suspended until completion of a currently executing computing platform executable command is detected. Completion in some instances may be detected based on a change in modal window status, a change in window focus, and/or an expected file and/or file location being created.

According to certain example embodiments, at least some user action command representations may have metadata associated therewith, e.g., with the metadata indicating a file location, filename, and/or one or more arguments or argument representations to be passed to an operating system independent command. In some instances, the metadata may be retrievable from a file accessible via the computing platform.

According to certain example embodiments, the mapping of each user action command representation into a computing platform executable command may include translating an operating system non-specific command into a command type suitable for execution by the processing resources of the computing platform.

According to certain example embodiments, a human-machine interaction may be prompted for, e.g., upon an unsuccessful attempt to automatically execute a given computing platform executable command.

According to certain example embodiments, each entry in the timeline representation may represent a single semantic concept.

According to certain example embodiments, each entry in the script that lacks an associated simulated user interaction event but nonetheless is likely to involve a user action prompt may be identified, and the conversion may be performed for (a) each entry in the timeline that has an associated identified simulated user interaction event, and (b) each entry identified as likely to involve a user action prompt. In some instances, filtering of the timeline representation may be performed to remove those entries that neither have an associated identified simulated user interaction event, nor are identified as being likely to involve a user action prompt.

In certain example embodiments, a method of generating and/or automatically running on a computing platform computer-implementable instructions is provided. Audiovisual input corresponding to an instructions model from which the computer-implementable instructions are to be generated is received, with the instructions model having semantic concepts that are summarized therein and are translatable into the computer-implementable instructions but that follow a natural language pattern and include visual cues rather than an input pattern expected by a formalized computer command language. Using processing resources including at least one processor and a memory operably coupled thereto, the semantic concepts included in the instructions model are recognized, with the recognizing including a plurality of different identification levels, and with the different identification levels respectively corresponding to recognitions of semantic concepts in the instructions model including (a) objects, (b) actions for at least some of the recognized objects, and (c) metadata for at least some of the recognized objects. At least some of the semantic concepts are recognizable in connection with a grammar that includes possible semantic concepts that are relevant to interactions that can be taken in connection with a computing platform but that are computing platform independent. A digitized version of the instructions model is generated by organizing results of the recognitions. The digitized version of the instructions model is transformed into a set of computer-implementable instructions operable on the computing platform in accordance with a set of rules defining relationships between elements in the digitized version of the instructions model and the formalized computer command language. The set of computer-implementable instructions is stored for subsequent execution, with the set of computer-implementable instructions being executable at least in part using processing resources of the computing platform, automatically and without user intervention.

According to certain example embodiments, the method may further comprise: splitting audio from the audiovisual input into discrete sentences; identifying and tagging each word in each discrete sentence with a part of speech corresponding to a way in which it is used in the natural language pattern that the instructions model follows; for each discrete sentence, and based on the tags, grouping together syntactically correlated words into one or more phrases; separating each discrete sentence into one or more meaningful parts; identifying as context-relevant each meaningful part that includes (a) a phrase and/or (b) a word that is not a part of a phrase, that correspond(s) to a semantic concept found in the grammar; and for each identified context-relevant meaningful part, creating a candidate object for inclusion in digitized version of the instructions model, each created candidate object having associated therewith derived metadata properties including a proposed order, proposed name, and proposed type.

According to certain example embodiments, syntactically correlated words, from audio from the audiovisual input, may be grouped together into one or more phrases, the grouping involving at least two different phases, at least one of the phases being a positive filter for grouping together different words and at least one other of the phases being a negative filter for discarding words. For instance, a first phase may be chunking and a second phase may be chinking, and the first and second phases may be performed in this order.

According to certain example embodiments, the method may further include identifying, as context-relevant, different parts of different identified discrete sentences from audio from the audiovisual input that respectively include (a) a phrase and/or (b) a word that is not a part of a phrase, that correspond(s) to a semantic concept found in the domain-specific grammar and/or the general grammar.

According to certain example embodiments, each computer-implementable instruction in the set may correspond to a command-line operation or a series of one or more mouse events.

Certain example embodiments relate to a method of automating execution, on a computing platform, of digitized natural-language instructions provided in a video. Computing platform executable commands stored in connection with the approaches summarized above and/or set forth herein are provided/stored. The stored computing platform executable commands are retrieved, and an attempt is made to execute the retrieved computing platform executable commands, automatically and without user intervention.

In addition to the features of the previous paragraphs, counterpart systems, computing platforms, non-transitory computer readable storage media tangibly storing instructions for performing such methods, executable computer programs, and the like, are contemplated herein, as well.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 3 schematically shows source video being processed to create a collection of frames and an audio transcript, in accordance with certain example embodiments;

FIG. 10 is a code snippet for frame generation, which may be used in connection with certain example embodiments;

FIG. 11 is a code snippet for mouse action tracking and capturing the area around mouse, which may be used in connection with certain example embodiments;

FIG. 12 is a code snippet for detecting a text string in each frame and captured mouse area, which may be used in connection with certain example embodiments;

and

Figure 1:
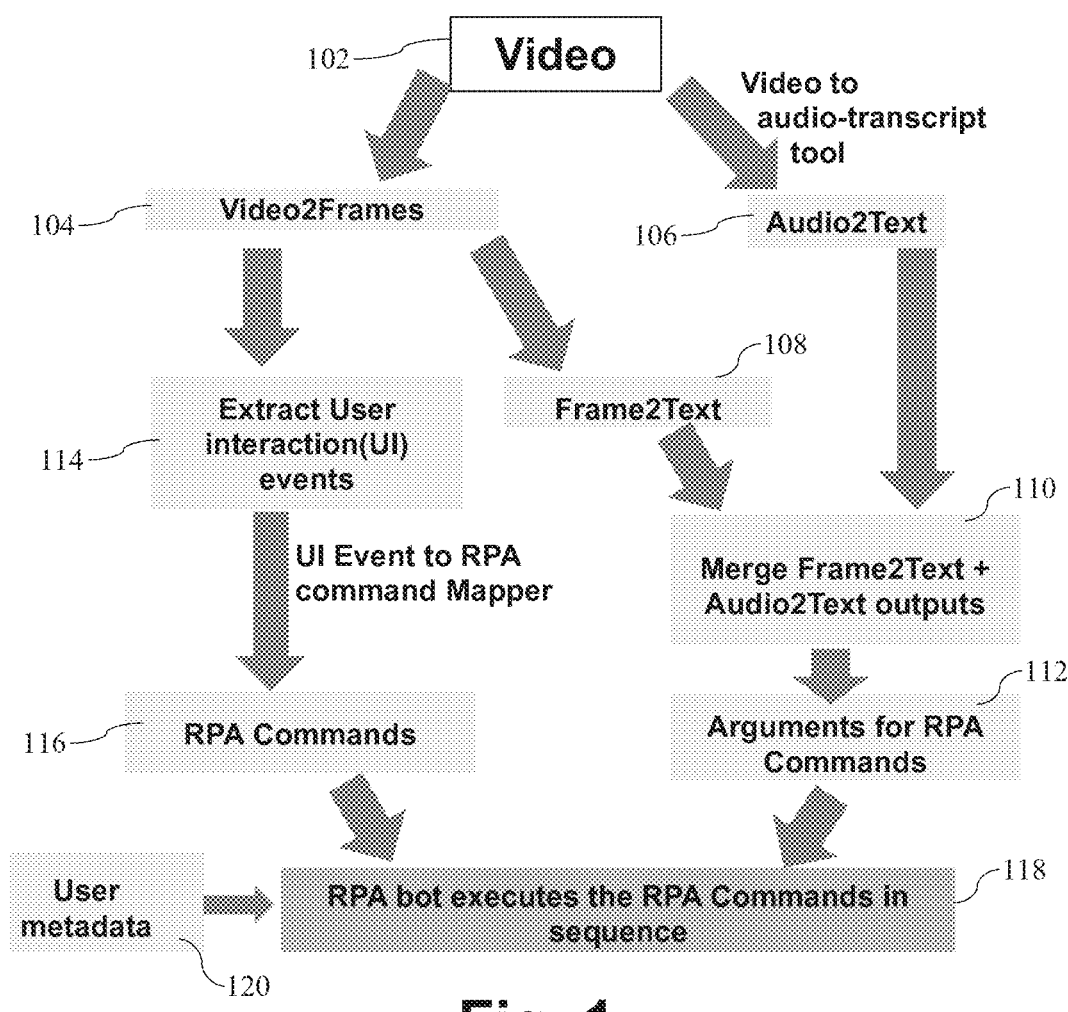
FIG. 1 is a flowchart showing video being converted into a local system executable command sequence, in accordance with certain example embodiments.

FIG. 13 is a code snippet showing the execution of a detected command along with action of mouse, which may be used in connection with certain example embodiments.

DETAILED DESCRIPTION

Certain example embodiments described herein relate to techniques of using existing content for automation with a blend of user intuitiveness. More particularly, certain example embodiments described herein relate to systems and/or methods that implement a user-interactive approach to transforming video into automated user-intuitive executables, where such executables may be thought of as being sequences of robotic process automation (RPA) or other commands mimicking the user actions and/or instructions provided in audio and/or video, e.g., towards accomplishing a goal related to the video (such as, for example, installing new software, fixing an application or computing platform problem, removing a virus, configuring a network, etc.). In this sense, executables may be scripts, a series of shell commands, binaries (such as EXE files), and/or the like. In general, RPA is an emerging form of process automation technology that uses software robots and/or artificial intelligence (AI) workers. Workflow automation in certain example embodiments thus may be provided by having a software developer produce a list of actions to automate a task and interface to the back-end system using internal application programming interfaces (APIs), dedicated scripting languages, or the like, and/or an action list developed by watching a video of the task being performed (e.g., from a graphical user interface interaction provided by a developer in real-time, in the past, from a video clip provided on a website of the software provider's, a public repository like YouTube, etc.) and then performing the task by repeating the actions on the local system.

The inputs to the system are the video, metadata of video, user current system information, local or remote text resources related to current video, user metadata stored in a file with login credentials/product installation metadata, etc. For example, credentials may be user-provided, read into the RPA engine, and/or retrieved via suitable API calls or other lookups (e.g., by using UiPath.Credentials.Activities.GetSecureCredential in Windows-based environments in which the Windows Credential Manager is used). In certain example embodiments, credentials additionally or alternatively can also be imported from a file formatted in XML, plain text, or the like, which can be used as appropriate during auto-execution. Further detail is provided below as to how inputs can be received and used, e.g., with respect to this and/or other action-related and configuration-related information.

Output may include an executable including a series of RPA or other commands One strength of generating an executable from video is that the existing content generated can be reused and can be made user intuitive in performing tasks, making the information easy to grasp and processable by software. Further details about the output and how it may be created are provided below.

Certain example embodiments help bridge the gap between the spontaneous, unstructured and/or only loosely structured nature of more freely-flowing live or recorded conversations, and software and computerized modeling systems, e.g., enabling at least partially auto-executing models to be created from such conversations. For instance, certain example embodiments address the media discontinuity when instructions (e.g., for fixing a problem with software or a computing system, installing a program, performing a task using software, etc.) are described in help, product demonstration, brainstorming, planning, and/or other sessions, and the desire to create models of those discussions that can be stored as representations electronically on computers in a computerized and standardized modeling language format—as well as between those stored models and the actions to be taken based on those models. This approach is technically advantageous, as execution can be done quickly, accurately, and more directly, from the original idea phase at which they are presented, thereby bypassing the need for physical media, and physical media designed in accordance with a predefined format, while also reducing and potentially eliminating the need for an understanding of how specialized modeling software works, how models are to be formatted, etc.

Video and audio recording/conferencing in general allows computer technology to be brought into meeting situations, and modeling software in certain example embodiments can be used during discussions to digitally capture results more directly. With a video computing approach, a model can be created in the software in a more direct, digital manner, and can be refined and distributed therefrom after the meeting. Video computing therefore aids in removing the media break discussed above. Fortunately, participants can focus on the discussion and the results, while the audio and/or video can be modeled using software and can be processed to understand execution steps. Video and audio recording/conferencing solutions also typically allow multiple people to provide input at a time. Thus, the ability to accommodate instructions and contributions from a plurality of different sources in parallel is feasible and possible in most cases. There also is a reduced risk of becoming lost in technical details, as opposed to focusing on the actual subject. Certain example embodiments also reduce the need to have technical people familiar with the "ins-and-outs" of software and/or computing system to be present and engaged in the discussions, modeling, and/or creation of the executables. Similarly, certain example embodiments also reduce the need to have technical people familiar with the "ins-and-outs" of software and/or computing system to be directly involved in execution of the models once they are created.

Certain example embodiments transform conversations that often are free-flowing and lack a concrete relationship to a formalized input pattern, into a standardized language format. As will be appreciated, such conversations can take place in live demos, live help sessions, etc. This transformation is aided through the use of extensible grammars. For instance, in certain example embodiments, semantic concepts in the free-flowing live or recorded video and/or audio conversation are recognized in connection with a general grammar that includes possible semantic concepts that are relevant to the computerized model and that are arranged hierarchically but that are domain-independent, and/or one or more domain-related grammars that include possible semantic concepts that are arranged hierarchically and associated with a domain to which the computerized model being created belongs. The use of a "general" grammar is technically advantageous in that, among other things, it provides for a basic level of interoperability, regardless of what type of execution/action is being done, the domain(s) to which the model belong(s), etc. Moreover, although video processing, voice recognition technology, text analysis, and natural language processing are inherently technical in nature, the use of different grammars in the ways described herein further improve on these underlying technologies, e.g., by facilitating a baseline level of interoperability regardless of domain, deployment system, physical elements to be manipulated post-deployment, etc., which in turn advantageously leads to much more accurate and precise model creation.

Certain example embodiments involve a multi-stepped or multi-phase transformation where the decoded frames, text in each frame, audio in a certain time line, recognized text, etc., can be manually corrected. This multi-pass approach advantageously aids in providing for smoother conversions from video with audio and text to the formalized executable language.

The techniques disclosed in U.S. application Ser. No. 15/952,338 filed on Apr. 13, 2018 may be used in these regards. For example, certain example embodiments relate to a method of generating and automatically running on a computing platform computer-implementable instructions. Audiovisual input corresponding to an instructions model from which the computer-implementable instructions are to be generated is received. The instructions model has semantic concepts that are summarized therein and are translatable into the computer-implementable instructions but that follow a natural language pattern and include visual cues rather than an input pattern expected by a formalized computer command language. The semantic concepts included in the instructions model are recognized, with the recognizing including a plurality of different identification levels, and with the different identification levels respectively corresponding to recognitions of semantic concepts in the instructions model including (a) objects, (b) actions for at least some of the recognized objects, and (c) metadata for at least some of the recognized objects. At least some of the semantic concepts are recognizable in connection with a grammar that includes possible semantic concepts that are relevant to interactions that can be taken in connection with a computing platform but that are computing platform independent. A digitized version of the instructions model is generated by organizing results of the recognitions. The digitized version of the instructions model are transformed into a set of computer-implementable instructions operable on the computing platform in accordance with a set of rules defining relationships between elements in the digitized version of the instructions model and the formalized computer command language. The set of computer-implementable instructions is stored for subsequent execution the set of computer-implementable instructions, that set being executable at least in part using processing resources of the computing platform, automatically and without user intervention.

The method may include, for example, splitting audio from the audiovisual input into discrete sentences; identifying and tagging each word in each discrete sentence with a part of speech corresponding to a way in which it is used in the natural language pattern that the instructions model follows; for each discrete sentence, and based on the tags, grouping together syntactically correlated words into one or more phrases; separating each discrete sentence into one or more meaningful parts; identifying as context-relevant each meaningful part that includes (a) a phrase and/or (b) a word that is not a part of a phrase, that correspond(s) to a semantic concept found in the grammar; and for each identified context-relevant meaningful part, creating a candidate object for inclusion in digitized version of the instructions model, each created candidate object having associated therewith derived metadata properties including a proposed order, proposed name, and proposed type.

Syntactically correlated words, from audio from the audiovisual input, may be grouped together into one or more phrases, with the grouping involving at least two different phases, and with at least one of the phases being a positive filter for grouping together different words and at least one other of the phases being a negative filter for discarding words. For instance, a first phase may be chunking and a second phase may be chinking, with the first and second phases being performed in this order.

Different parts of different identified discrete sentences from audio from the audiovisual input that respectively include (a) a phrase and/or (b) a word that is not a part of a phrase, that correspond(s) to a semantic concept found in the domain-specific grammar and/or the general grammar, may be identified as context-relevant.

The data extracted from the video is transformed into the computerized executable with sequential commands in accordance with a set of rules defining actions with hardware and software. Data extracted from video include the flow of user actions during execution of task like change in text, open/close of windows, the user entering a username/password combination or other information, server name information, mouse clicks, and/or the like. These and/or other evets events are extracted and are mapped to one or more RPA or other commands by a mapper. As will be appreciated from the above, RPAs can be used as tools that monitor user inputs and repeat the tasks on the GUI directly. Unlike normal RPA usage, however, the "user" is an active entity in a live or prerecorded video and, accordingly, the video is analyzed to understand user actions and is fed to the RPA to execute the task. The final video analysis is used in the generation of a sequence of RPA or other commands Existing RPA platforms such as, for example, Blue Prism, UiPath, etc., may be adapted in this regard. Advantageously, the suggested video transformation may be flexible and adjustable for execution on different hardware and software.

Example Implementation

Details concerning an example implementation are provided below. It will be appreciated that this example implementation is provided to help demonstrate concepts of certain example embodiments, and aspects thereof are non-limiting in nature unless specifically claimed. For example, descriptions concerning example component configurations; code; monitored and represented resources, activities, and events; grammars and grammar types; etc., are non-limiting in nature unless specifically claimed.

In certain example embodiments, a system for creating an executable (e.g., a sequence of RPA or other commands) usable in connection with an enterprise platform is provided. The executable is defined in connection with hardware and software related metadata. Processing resources including at least one processor and a memory operably coupled thereto are configured to control the system to at least: receive, over the video and audio input interface, video and audio input. An audio/video processing engine splits the video into frames and recognizes, for the frames, complementary text, audio input, mouse pointer and/or other user actions, etc., identifying actionable keywords and attaching metadata (such as, for example, system information, processing capability, geography information, etc.). Extracted words are tagged and used in identifying actionable steps that are converted into executable operations, in accordance with a set of rules defining relationships between elements in the digitized iteratively-reviewed version of the orally-described model and the formalized executable language.

As will be appreciated from the above, the derivation of a partial or complete automation executable from a video is broken into multiple steps. A partial or complete executable may need user intervention to provide credentials, select features, confirm certain selections, etc. The creation of the executable can become more complete and/or more automated by providing, for example, details in a metadata file that is consumed during creation of the executable and/or its actual execution.

Figure 2:
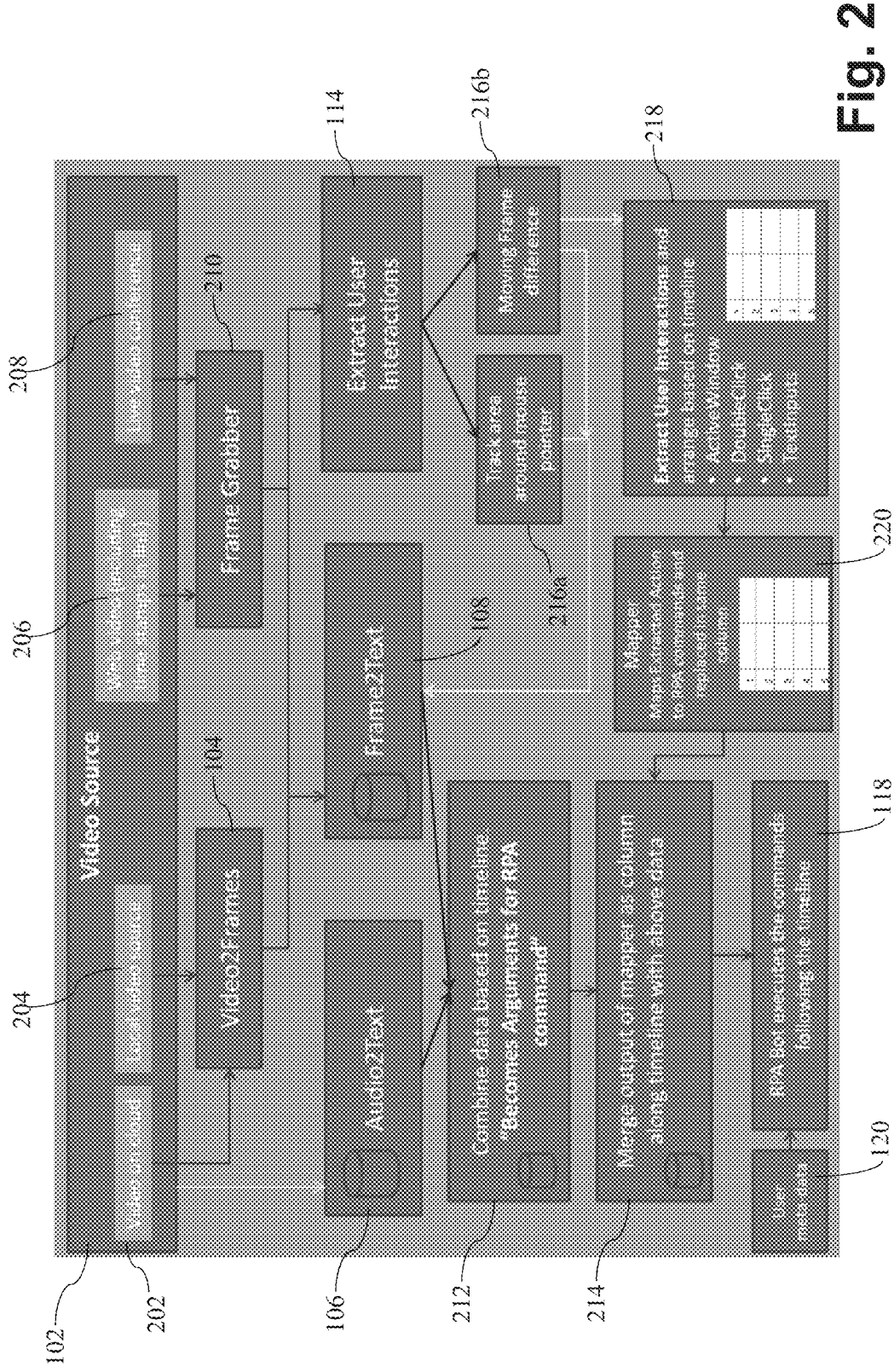
FIG. 2 is a block diagram showing an example architecture of the system of certain example embodiments.

Referring now more particularly to the drawings in which like reference numerals indicate like parts throughout the several views, FIG. 1 is a flowchart showing video being converted into a local system executable command sequence, in accordance with certain example embodiments, and FIG. 2 is a block diagram showing an example architecture of the system of certain example embodiments. As shown in FIGS. 1-2, video 102 serves as input. This video 102 may be from a pre-recorded or live video is input source (such as, for example, pre-stored video from the cloud or other network source 202, video stored locally 204, a web video 206 that may include timestamp information in the like such as, for example, YouTube type videos, a live video conference or other stream 208, etc.) from which actionable tasks and related keywords will be extracted to build the final job to execute.

Frames from the video are extracted at a regular, predefined interval. Video is encoded with a certain number of frames per second (FPS), and the frame rate for extraction may be based on the quality of the video (e.g., such that higher quality video is extracted at a higher rate) or set to a minimum threshold. In general, humans can understand video at 12 FPS. Although video at this rate will appear choppy, it may be a rate at which information contained in frames has relevance. In certain example embodiments, the frame rate for extraction will be at least 12 FPS (e.g., 12-30 FPS, or 12-25 FPS). Higher frame rates may be used, but it will be appreciated that there is a trade-off in terms of the computational power needed and the likelihood of obtaining information that could not be obtained at a lower frame rate. When source video 102 is to be extracted from a stored file, a video-to-frame software module 104 may be used. On the other hand, when source video 102 is to be extracted from a video stream, a frame grabber software module 210 may be used. For converting video to frames in either case, video processing libraries and software such as, for example, OpenCV or the like may be used. The captured frames are sent to further engines for processing.

Audio may be processed separately from the video. For instance, in certain example embodiments, audio may be extracted from the video source (or retrieved from a separate store, over a link to a phone system in the case of a conference call, etc.). The audio is digitized and turned into a transcript. This extraction and/or transcription creation may be facilitated using an audio-to-text software module 106 such as, for example, Trint.

FIG. 3 schematically shows source video 302 being processed to create a collection of frames 304 and an audio transcript 306 (e.g., using the software tools and libraries noted above), in accordance with certain example embodiments.

Figure 4:
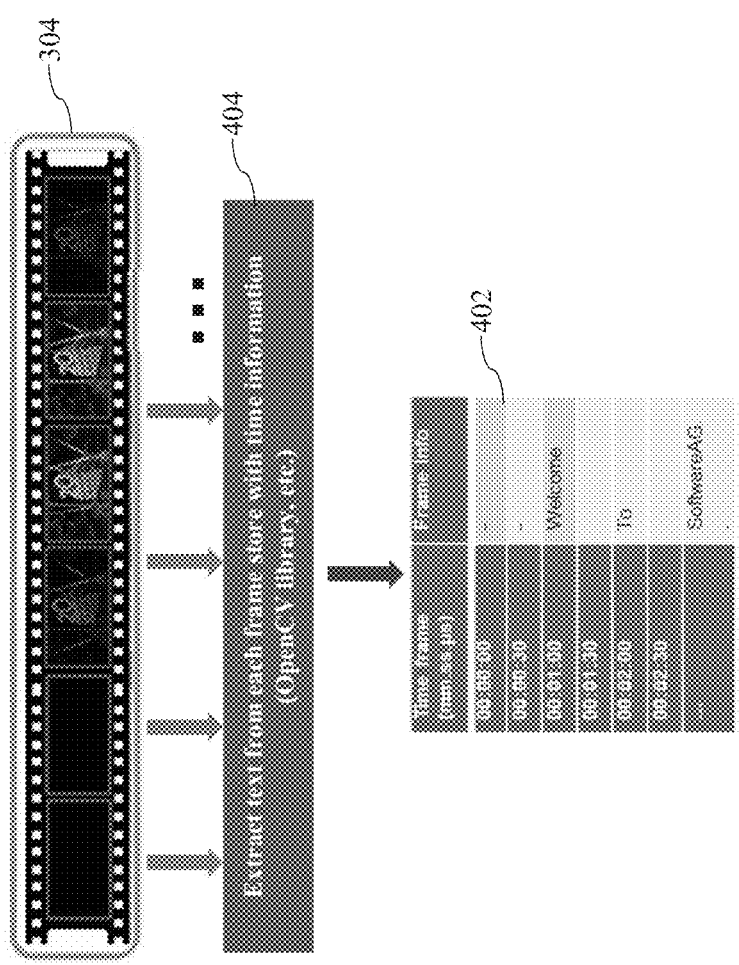
FIG. 4 schematically shows text from video frames being inserted into a timeline 402, in accordance with certain example embodiments.

The frame-to-text module 108 may receive the extracted or otherwise isolated frames and perform optical character recognition (OCR) and/or other techniques thereon, e.g., to identify text and/or other cues therein. According to certain example embodiments, the audio-to-text module 106 may be configured to create a transcript 306 based on a timeline that is matchable with or otherwise relatable to a timeline generated by the frame-to-text module 108. FIG. 4, for example, schematically shows text from video frames being inserted into a timeline 402, in accordance with certain example embodiments. The timeline is generated by having program logic 404 (e.g., including the OpenCV and/or other libraries) analyze frames, extract text, recognize text, and associated recognized text with times in the timeline 402. The information in the timeline 402 may include the raw recognized text or text processed in some way (e.g., text annotated as described in the following paragraphs) along with a timestamp association.

In certain example embodiments, one timeline may be used to hold data extracted from the audio-to-text module 106 and the frame-to-text module 108, either initially or after different timelines have been merged. FIG. 1, for example, shows a merger process 110 for combining the outputs from the audio-to-text module 106 and the frame-to-text module 108. That is, in certain example embodiments, a timeline may be thought of as being a record table or other data structure that holds text outputs from the audio-to-text module 106 and the frame-to-text module 108 in different columns or the like. As described in greater detail below, the combined data representation or combined timeline 212, which can be used as arguments for the RPA commands 112 as discussed in greater detail below.

Figure 5:
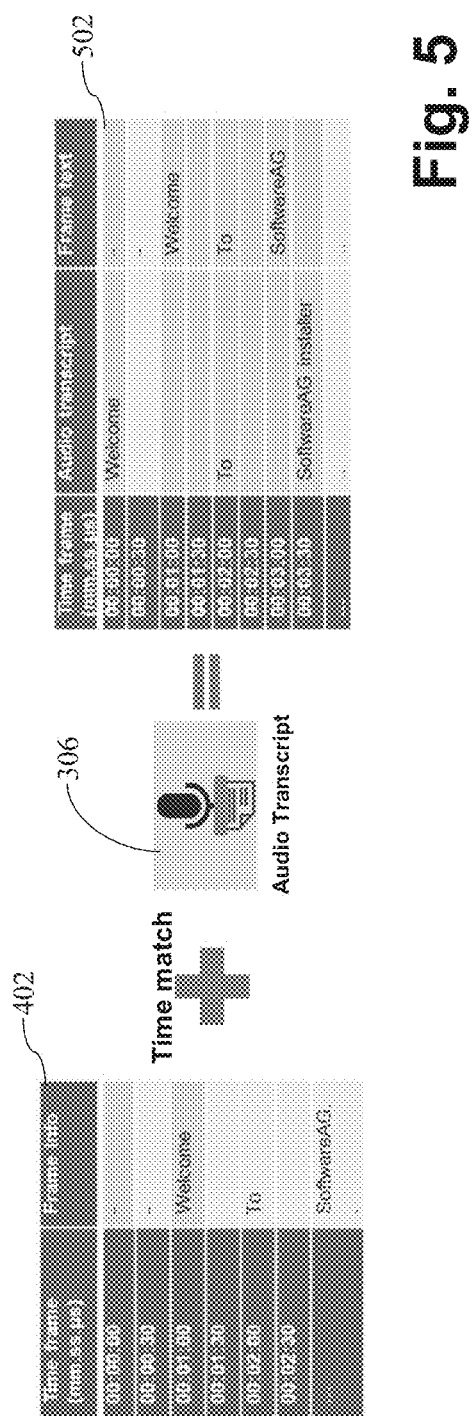
FIG. 5 schematically shows a timeline generated in connection with the frame-to-text module being merged with the audio transcript into a record table, in accordance with certain example embodiments.

FIG. 5 schematically shows the timeline 402 generated in connection with the frame-to-text module 108 being merged with the audio transcript 306 into a record table 502, in accordance with certain example embodiments. The timeline 402 includes the text output from the frame-to-text module 108 as discussed above, and the audio transcript 306 is generated by the audio-to-text module 106 as discussed above. The record table 502 here includes a timeframe marker column and columns corresponding to text extracted from the audio transcript 306 and from the frames.

Figure 6:
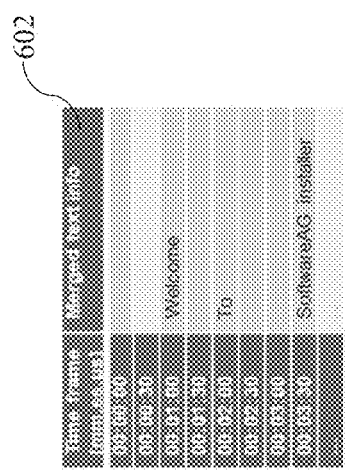
FIG. 6 is a table showing the text extracted from the audio transcript and from the frames being merged, in accordance with certain example embodiments.

The merging of text into the record table 502 may result in a representation that enables actions to be identified and grouped together. FIG. 6, for example, is a table showing the text extracted from the audio transcript 306 and from the frames being merged, in accordance with certain example embodiments. By merging extracted text elements from these different sources, common cues can be identified, and the overall accuracy can be increased. For instance, in the FIG. 6 example merged text info table 602, common "welcome" cues indicating that the process to be formalized and turned into an auto-executing routine are identified.

The merging of the entries in the record table may be facilitated based on timeline and word occurrence information. For instance, the same or similar textual cues that occur within the same or similar timeframes across the different text sources (e.g., from the audio transcript 306 and from the frames) likely should be grouped together. Similarly, words that repeat across the different text sources also likely relate to the same element. Word occurrence information also may be used to separate those cues that likely are important from those cues that likely are extraneous. For instance, words having the highest frequencies against the timeline may be kept in the merged information shown in FIG. 6, while the other words may be discarded. As this merged text info may serve as a basis for RPA command, it is advantageous to have a defined list of precise cues.

According to certain example embodiments, the audio-to-text module 106 may configured to recognize the spoken words and generate a transcript and, in recognizing the words: split the audio extracted from the audio and/or video input into discrete sentences; identify and tag each word in each discrete sentence with a part of speech corresponding to a way in which it is used in the natural language pattern that the orally-described model follows; for each discrete sentence, and based on the tags, group together syntactically correlated words into one or more phrases; separate each discrete sentence into one or more meaningful parts; correlate what is recognized with mouse actions and/or other events and identify as context-relevant each meaningful part that includes (a) a phrase and/or (b) a word that is not a part of a phrase, that correspond(s) to a semantic concept found in one or more grammars (e.g., a general grammar pertaining to computer technology generally, a domain-specific grammar relating to the problem space or computing environment, etc.); and for each identified context-relevant meaningful part, create a candidate object for inclusion in the executable step, each created candidate object having associated therewith system-derived properties including a proposed order, proposed name, and proposed type. The created candidate objects may be user-reviewable in connection with the generation of the digitized iteratively-reviewed version of the orally-described model.

Additionally, or in the alternative, certain example embodiments facilitate interactive step-wise user review by displaying, receiving user confirmation of, and enabling user modification(s) to, results generated responsive to one or more of: the splitting into the discrete sentences of the video and/or audio input, the separation of each discrete sentence into the one or more meaningful parts by correlating with user mouse-actions captured in video, the identification of each context-relevant meaningful part, the creation of each candidate object, identification of the system-derived properties, etc.

The same or similar processing may be applied with respect to text from the frame-to-text module 108, e.g., so that written instructions embedded in the video can be identified and understood. That is, the same parsing, tagging, grouping, iterative review, and/or other procedures may be performed with respect to text from the frame-to-text module 108.

The same or similar processing may be applied with respect to the combined record table. That is, certain example embodiments may facilitate interactive, step-wise review of cues from the text derived from the audio transcript 306, text derived from the frames, and/or merged text. Each text entry in a table may be considered a candidate object until finally confirmed in the merged record table, in certain example embodiments.

As will be appreciated from the below, these extraction and review operations may be repeated for different time intervals of frames generation (e.g., depending on the FPS extraction). Similarly, as will be appreciated from the description that follows, data collected by the action extraction engine 114 can be correlated with these identified steps, and actions to be taken can be identified. Merging program logic 214 that considers timeline and word occurrence information also may take as input and incorporate into a data structure information about actions to be taken, also as described in further detail below.

The action extraction engine 114 in certain example embodiments extracts actions that can be taken by a user as prompted by the audio and/or video input, e.g., as facilitated by tools included in imagine processing libraries. The actions that may be extracted may include, for example, typing on a keyboard, mouse movements, mouse events, switching of windows, etc. This information can be determined in some instances by tracking changes that occur as between subsequent frames or subsequent extracted frames (e.g., as it is not always necessary to monitor for changes in each and every frame as noted above). The frames are compared with one another to extract what is new and to derive the user action that is being taken. Frame comparison can be facilitated using a frame subtraction technique, which can efficiently highlight the information that is new in the latest frame. The frame subtraction technique may highlight, for example, a new letter typed in an input field, a new window opened, etc. The switching or making active of a given window of the windows/view is also an action that can be captured. Switching to a new window or making a new window active can be captured by analyzing frames under a timeline. Windows/view titles can be a defined area of interest and analyzed accordingly. For instance, the title bar on a window can be identified, and the information therein can be extracted and analyzed to indicate whether a new window has been made active (e.g., based on whether the title bar information has changed between subsequent frames).

In general, action identification can be put into categories such as, for example, activate window (e.g., identified by ActiveWindow event); processing based on cursor (e.g., identified by DoubleClick event); select or highlight text/file/other object (e.g., identified by SingleClick event); change text entered by user; etc. The action extraction engine 114 may interface with program logic portions (e.g., image processing libraries) to aid in this extraction and identification. FIG. 2, for example, shows a first image processing module 216a for tracking an area around a mouse pointer, a second image processing module 216b for performing frame subtraction, and further image processing modules may be implemented in the above-identified and/or other respects.

By way of example, the action of new window being opened in a video can be determined to be an action to be captured and subsequently simulated by tracking the title bar of the new window. This information indicates what window is to be opened. An RPA or other action to perform the same task can be defined. This defined RPA or other action can perform the task of opening the window without completely mimicking the steps in the video because the intent in the video can be inferred and executed on. For instance, certain example embodiments can avoid having to navigate to a particular icon and initiate a double click event thereon and instead can run a shell or other command "behind the scenes" to open a particular application.

In some instances, multiple candidate actions may be identified. These actions may have an express ordering that is discernible by examining textual and/or audio cues. In other instances, the ordering may not be readily discernible. In such instances, a user may be prompted to specify or confirm an order in which different operations are to be performed. In certain example embodiments, when inferring an ordering or presenting a potential ordering for user confirmation, predefined computer-implemented rules about how to arrange different candidate actions may be followed. For instance, words highlighted by a user typing or an area captured around a mouse cursor can be given higher priority compared to other candidate actions, as typing or mouse clicking surely relates to a user action. Predefined areas of interest may be established, e.g., so that certain example embodiments look to extract text from, for example, window title bars, editable text boxes, etc.

Figure 7:
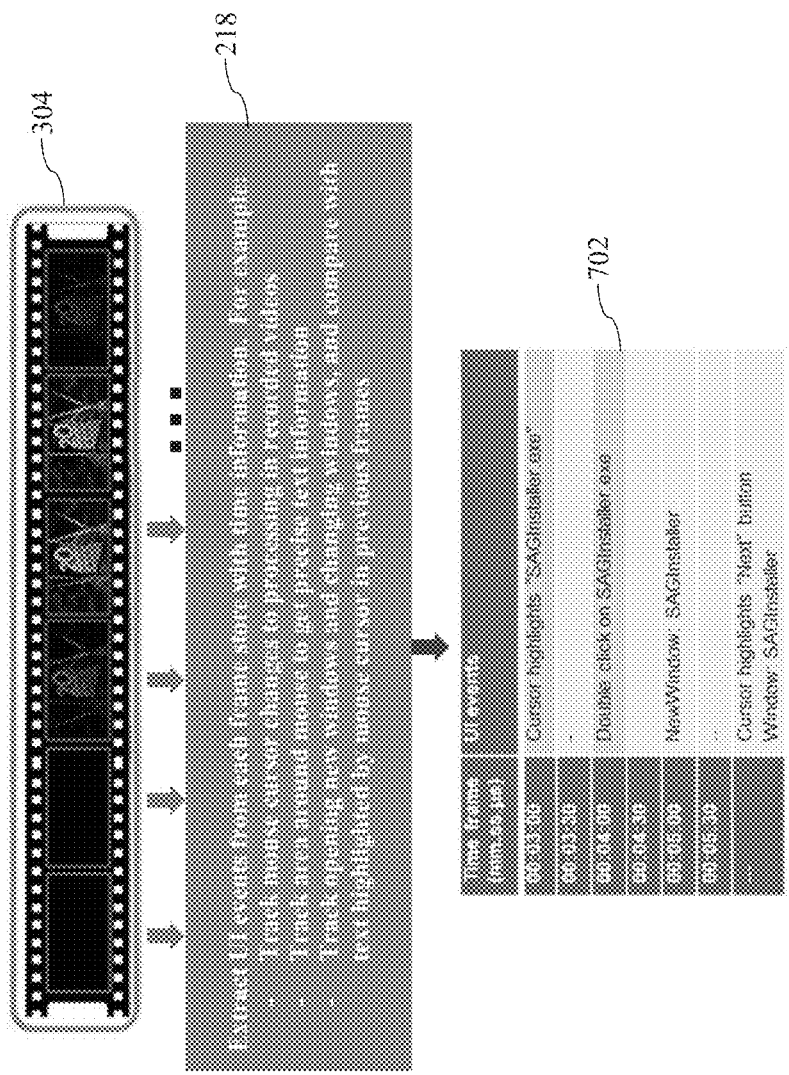
FIG. 7 schematically shows user interaction information being extracted from a video or other input source and being arranged in a timeline, in accordance with certain example embodiments.

FIG. 7 schematically shows user interaction information being extracted from a video or other input source and being arranged in a timeline, in accordance with certain example embodiments. The extraction of this information may be performed in connection with extraction program logic 218, and the timeline representation 702 that may be generated may be the same as, or different from, the timeline representation(s) mentioned above. As discussed in greater detail below, information from the extraction program logic 218 ultimately may be merged with the earlier-discussed timeline representation(s) to develop a more fully defined script of commands that are executable.

Figure 8:
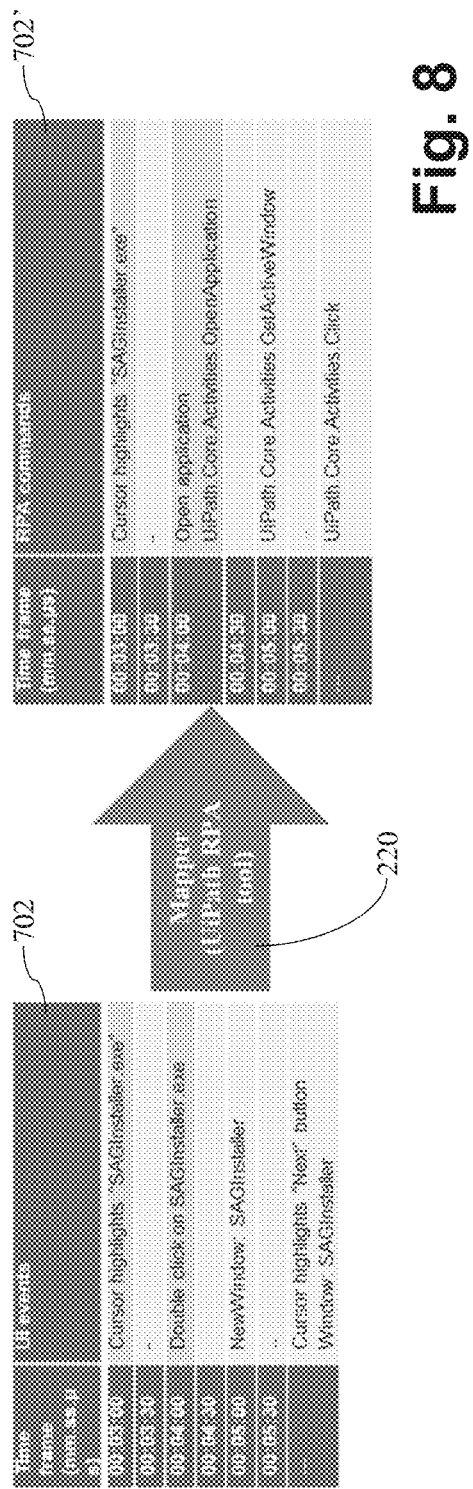
FIG. 8 schematically shows the functionality of the mapper, in accordance with certain example embodiments.

The mapper 220 is an engine that maps the extracted user interactions to RPA or other commands and updates the record table in certain example embodiments. FIG. 8 schematically shows the functionality of the mapper 220, in accordance with certain example embodiments. As shown in FIG. 8, entries in the timeline 702 generated by the extraction program logic 218 are mapped to RPA or other commands in the representation 702', with corresponding timing information being maintained. In certain example embodiments, the RPA or other commands may be mapped using UiPath RPA software, as an example. The UiPath RPA software system activities pack enables robots to perform activities such as, for example, manipulate data tables by adding or extracting information, directly interact with directories and files on a machine in a manner that a human user would, implement logical operators and expressions, etc. Other RPA tools may be used in different example embodiments, so the mapper 220 can be customized to map to required RPA or other tool.

Figure 9:
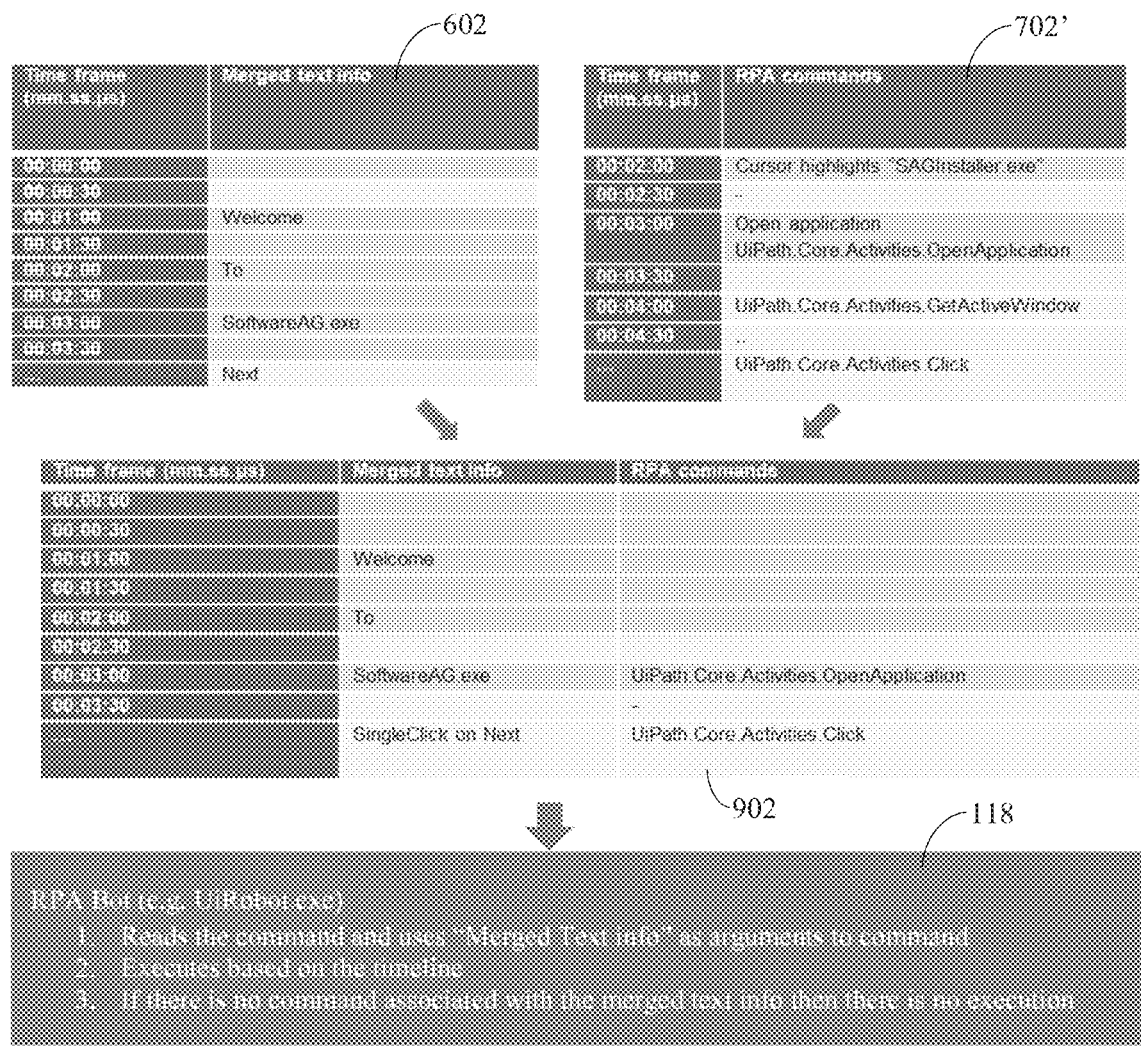
FIG. 9 is shows merged text information and RPA commands being further merged into the record table, in accordance with certain example embodiments.

FIG. 9 shows merged text information 602 and RPA commands 702' being further merged into the record table 902, in accordance with certain example embodiments. This further merging may be accomplished in connection with the merging program logic 214. Once the record table 902 is built, it may be used by the RPA bot 118 for execution. In this regard, entries in the final record table 902 may be processed sequentially for execution. The merged text information 602 may be used as arguments for the corresponding RPA commands 702' (e.g., linked based on timeframe information) when executed by the RPA bot 118, in certain example embodiments. In certain example embodiments, if there is no command associated with the merged text information entry, then no execution will take place. The invocation of RPA bot 118 may be performed in connection with the mapper 220, which may assist in mapping inferred user actions in the record table 902 to local system commands, e.g., using RPA tools. The use of the mapper will be explained in greater detail below.

The RPA bot 118 in certain example embodiments may import metadata 120 to reduce the amount of manual intervention that might be required during auto-execution. The metadata 120 may include information such as, for example, path information, user credential information (e.g., username and password combinations), internal server links, links to a database, etc. The metadata 120 can be stored locally or remotely, e.g., in a file, and it can be read by the RPA bot 118, e.g., to fill in parameters as and when required while executing the sequence of commands. This metadata 120 may include key-value pairs, e.g., where the key is the name or descriptor of a field seen in a video. The following table shows example key-value pairs that may be used in this regard.

| Key | Value |
| --- | --- |
| Username | Admin |
| Password | AdminPassword |
| Proxy Server | 10.10.20.20 |
| Port | 6666 |

Many RPA tools have the capability to import data on the fly from a file of a standardized format. Such functionality can be added to RPA tools, as well, to provide the same or similar capabilities. For example, the UiPath RPA tool when used in connection with a single node installation in connection with the Windows installer can be extended to enable selection of an authentication mode from one of the following and/or other options:
  APPPOOL_IDENTITY_TYPE: If set to USER, a username and password combination may be provided. In this regard, APPPOOL_USER_NAME parameter may represent the username running the application pool, and APPPOOL_PASSWORD may represent the password of the user running the application pool.
  Windows Integrated Authentication: This option may be set as the default option. If selected, the Orchestrator may connect to the database using the detected IIS Application Pool's Windows account and create the database or other object using the Windows credentials with which the user currently is logged in.
  SQL Server Authentication: If this option is selected, the SQL username and password fields may be displayed and then may be filled in with the SQL Server username and password.

As will be appreciated from the description above, certain example embodiments transform, combine, and process input data in connection with a record table in order to create a resulting executable script. In this regard, in certain example embodiments, the record table at least initially includes time windows/timeframes, audio input related text, video input related text, and user interface/user interaction information. The input is processed and put into different columns of the record table, e.g., within a configurable time window. It is merged to generate a timeline of activities that can be used to inform what commands should be executed. For instance, after processing, the record table may be reduced to two columns, namely, a merged text information column, and an RPA commands column. The former may be used mainly as arguments to the RPA commands, and the latter may correspond mainly to user actions to be simulated in accordance with the at least partial auto-execution.

As will be appreciated from the above, the merged text information column is generated from frame-to-text and audio-to-text processing. It stores information based on a timeline, and the RPA bot is able to use this timeline to execute the commands in an appropriate sequence. The Frame2Text column records the text in each of the extracted frames of the video against the timeline. This text may include all text found in the frame. Different textual elements may be grouped together in certain example embodiments. In certain example embodiments, different textual elements may be tagged within a single timeline entry so as to indicate that they are different. For instance, it may be desirable to separate text associated with a changing title bar, text prompting a user to supply some information (such as file location, username, etc.), and so on. This data in the record table may be correlated with the area around the mouse and consecutive frame differences. Here, the area around the mouse may be a smaller and focused area of the entire frame. The consecutive frame difference may be the difference with the immediately adjacent frame (or at least the immediately adjacent frame that is extracted). This data may be saved against the timeline in the same record table but as a different column in certain example embodiments.

These two columns then may be merged, with prioritization being assigned based on the column type, area of a frame from which the text was retrieved, and/or the like. For instance, in certain example embodiments, the text found form the frames in areas around mouse actions and consecutive frame differences may be given highest priority, as this may be assumed to be the content user that the currently is updating. The total frame text also may be correlated with the text found in area around mouse actions and frame differences and may be added to record table.

Data from the frame, data from areas around mouse, and consecutive frame difference data, may be clubbed. The latter two columns may be clubbed first, as they tend to be highly correlated with one another and provide precise information about actions. The merging may be based on the timeline, and the merging may merge the text found and while repeating text may be reduced. This combined column then may be merged with the data from the frame and inserted into a final column. The words found in the first and combined column may be merged, and only those words in the combined column may be kept for future reference. This step may aid in verifying whether the text actually occurred in the frame. For example, if the text in combined column did not occur in the first column, then the text likely can be safely removed from the final frame-to-text column. This series of operations advantageously provides a precise indication of the data required to pass as arguments for a corresponding RPA command.

With respect to processing audio, as noted above, an audio transcript may be generated using a tool such as, for example, Trint. Semantic concepts may be based on the timeline. The timeline with the extraction may be the same as the frame-to-text timeline described in detail above, with the transcript being reflected in the record table as an audio-to-text column.

The combination of the frame-to-text and audio-to-text columns is the merged text information. The merging of the columns may be based on word frequency against the timeline. The words with highest frequencies in each timeline may be kept, e.g., with words below a threshold being discarded. Stop words and/or the like may be eliminated at least for consideration, so that overrepresented words with no or little semantic meaning (e.g., "the", "a", "an", etc.) are less likely to influence these operations.

The merged text information may include arguments for the RPA commands. The following table shows timeline data together with merged text information. As can be seen from this table, the merged text information includes an argument for an RPA bot (e.g., a file to execute, the name of an executing application, the button to click, etc.).

| Timeline | Merged Text Information |
| --- | --- |
| 00:10:00 | SAGInstaller.exe |
| 00:15:00 | SAGInstaller |
| 00:20:00 | Next |
| ... | ... |

The RPA Commands column is retrieved from the mapper module and will be arranged along the timeline as well. It involves user action detection and can make use of metadata defined for a computing system. For instance, subsequent frame difference may be take binary difference of subsequent frames. It is noted that frames may be considered subsequent even though they are not necessarily adjacent but rather are considered one after the other, e.g., as a result of capturing or grabbing frames at a predetermined rate that does not match the inherent frame rate of the video source. The frame extractor provides the frames with respect to the timeline, and subsequent frames may be re subtracted using an OpenCV method Core.absdiff (current frame, previous frame, difference frame) or the like.

The "difference frame" variable may save the difference between two frames. This difference frame may be fed to frame-to-text module with the timeline of the "current frame," and the extracted text may be stored against that timeline. Text extracted from the difference frame also may be merged during the merge with the audio transcript. Again, the logic of merge may involve removing repeating words or phrases and maintaining the last repeating word or phrases with respect to timeline, e.g., to keep the latest word or phrases occurrence in the timeline.

The "difference frame" now may be analyzed for user interaction identification. For example, if a mouse cursor turns into a processing icon (e.g., an hourglass, circle with rotating member, or the like) along with a new window, there is a probable double click of the mouse on an item highlighted by the mouse. This action then may be categorized as a "DoubleClick" event along with frame text at that timeline. This intuited action then is fed to the RPA column, where a double click action is mapped to an RPA command. As another example, if user click on a window and that action highlights the new window, the frame difference will only capture the change in the highlighting along with the title text of the new window. This may be determined to be a "FocusWindow" event, which is mappable to an RPA focused window command. As another example, for a click event, capturing an area around the mouse gives an indication that the mouse was on an area where the button was present, and the subsequent frame difference may indicate that the application screen has changed. That likely means that the user clicked on the button for to cause the event, which may be categorized as a "SingleClick" event. As still another example, a user can use a terminal to run a command, e.g., to open a window, execute a program, change system settings, etc. The subsequent frame difference may provide a complete chain of action to follow. For instance, the chain might include single click start menu (frame2 minus frame 1); single click on "command prompt" option in menu (frame5 minus frame 4); etc.

In general, identified actions can be categorized as one of the following and/or other types:

New Window/Focused window in frame difference: Activate Window

Mouse icon cursor changes to processing icon: Double-Click

Highlight text around mouse cursor: SingleClick

Simulated user interaction events determined to be present in the video can be identified as having a type belonging to a group of predefined user interaction event types, the group including (for example) click and double-click types.

Now, the extracted user interactions may be added to the record table as a new column matching with the timeline of frame from which it is detected. The extracted user interaction along with the frame text and audio transcript based on the timeline may be used to form the RPA command Keywords along with action identification as shown in FIGS. 7-8 can be used to invoke the action using the RPA bot or the like. In this regard, the invocation of the RPA bot or the like may be performed using a mapping tool that maps user actions to local system commands using RPA or other similar tools. The following table, for example, shows timeline information together with extracted user actions and merged text information. As shown in this table, the first action is a double click on the SAGInstaller.exe. This causes a new window to receive focus, namely, the SAGInstaller window. There is a single click on the next button, etc.

| Timeline | Extracted User Action | Merged Text Information |
| --- | --- | --- |
| 00:10:00 | DoubleClick | SAGInstaller.exe |
| 00:15:00 | NewWindow | SAGInstaller |
| 00:20:00 | SingleClick | Next |
| ... | ... | ... |

This mapper module maps the RPA commands to the user actions in the video. The following table provides examples as between keywords and UiPath commands in accordance with certain example embodiments.

| Keyword | RPA (UiPath) Command |
| --- | --- |
| Open browser (e.g., Chrome) | UiPath.Core.Activities.OpenBrowser<br>Arguments: Choose browser Chrome, IE, Firefox, etc. |

| Keyword | RPA (UiPath) Command |
| --- | --- |
| Open "SAGInstaller.exe" | UiPath.Core.Activities.OpenApplication<br>Input: FileName (here, SAGInstaller.exe) |
| Get Focused Window | UiPath.Core.Activities.GetActiveWindow |
| Open Window | UiPath.Core.Activities.OpenApplication ( ) |
| Close Window | UiPath.Core.Activities.CloseApplication ( ) |
| Click Event | UiPath.Core.Activities.Click<br>Target.ClippingRegion: Defines the clipping rectangle, in pixels, relative to the UiElement, in the following directions: left, top, right, bottom. It supports both positive and negative numbers. |

Although UiPath commands are provided, it will be appreciated that Windows, Linux, and/or other operating system commands may be used in certain example embodiments. With respect to a more Windows-like example, possible commands include "start cmd/K cd c:\". Thus, each user action command representation may be mapped into a computing platform executable command by, for example, translating an operating system non-specific command into a command type suitable for execution by the processing resources of the computing platform.

The final record table structure may be represented in accordance with the following table. It will be appreciated that the "extracted user action" column is replaced with the "RPA command" column following the mapping of detected actions, e.g., as more fully described above.

| Timeline | RPA command | Merged Text Information |
| --- | --- | --- |
| 00:10:00 | Open application<br>UiPath.Core.Activities.OpenApplication | SAGInstaller.exe |
| 00:15:00 | Focus window<br>UiPath.Core.Activities.GetActiveWindow | SAGInstaller |
| 00:20:00 | Click event<br>UiPath.Core.Activities.Click | Next |
| ... | ... | ... |
| ... | ... | ... |

In certain example embodiments, each entry in the record table may represent a single semantic concept.

As will be appreciated from the above, the data in the columns are arranged according to the timeline. Here, the RPA command is the detected user action, and the merged text information includes the arguments for the command. The RPA bot uses this record table and executes in sequence the commands therein. As indicated above, metadata may be used to provide computing environment related information such as, for example, authentication type information, username/password or other credential information, server addresses, path information, etc. The metadata in general is retrievable from a file accessible via the computing platform, e.g., in that it may be stored locally or remotely.

In this way, certain example embodiments generate a record table, or a form of the timeline representations discussed above, that includes entries for elements of the developed script, elements of the extracted text, and identified simulated user interaction events, where like elements of the developed script, elements of the extracted text, and/or identified simulated user interaction events are collected into common or linked entries in the record table. It is noted that certain example embodiments may seek to identify each entry in the script that lacks an associated simulated user interaction event but nonetheless is likely to involve a user action prompt or the like. This may be the case because some cues or instructions may not necessarily be accompanied by user interaction events (e.g., lookup instructions, external configuration instructions, instructions to insert a DVD or flash drive, etc.) may not be accompanied by user interaction event. User action prompts can be provided, for example, for suspected download and run operations. Thus, (a) each entry in the timeline that has an associated identified simulated user interaction event, and (b) each entry identified as likely to involve a user action prompt, may be converted into an RPA or other command Certain example embodiments in essence may involve filtering the timeline representations to remove those entries that neither have an associated identified simulated user interaction event, nor are identified as being likely to involve a user action prompt.

It will be appreciated that these executable instructions may be stored as an intermediate model or representation (e.g., to a data store), potentially for subsequent execution in a computing environment such that processing resources (including at least one processor and a memory coupled thereto) can attempt to execute them at a later time, e.g., with at least some of these computing platform executable commands being executable automatically and without user intervention.

In certain example embodiments, execution of these computing platform executable commands may be attempted in an order corresponding to counterpart entries in the timeline representations and/or record table. In some instances, attempted execution of the computing platform executable commands may be paused until completion of a currently executing computing platform executable command is detected. Completion may be detected in some cases based on a change in modal window status, a change in window focus, an expected file and/or file location being created, and/or the like. In some instances, an instruction may prompt for a human-machine interaction upon an unsuccessful attempt to automatically execute a given computing platform executable command.

FIGS. 10-13 are code snippets showing how certain example techniques may be implemented. More particularly, FIG. 10 is a code snippet for frame generation, which may be used in connection with certain example embodiments; FIG. 11 is a code snippet for mouse action tracking and capturing the area around mouse, which may be used in connection with certain example embodiments; FIG. 12 is a code snippet for detecting a text string in each frame and captured mouse area, which may be used in connection with certain example embodiments; and FIG. 13 is a code snippet showing the execution of a detected command along with action of mouse, which may be used in connection with certain example embodiments.

Certain example embodiments provide an end-to-end solution in which video is received and processed and the generated instructions are executed. Different example embodiments may, however, "only" process the video and generate instructions for later execution on the same or a different computing platform. Similarly, different example embodiments may "only" retrieve pre-generated instructions for execution thereon. Thus, it will be appreciated that certain example embodiments relate to computing platforms that include at least one data store, and processing resources including at least one processor and a memory, the processing resources being configured to run an operating system and execute instructions using the operating system. Those processing resources may be configured to retrieve the video and process it locally for execution of instructions locally, make available generated instructions for processing elsewhere, and/or receive pre-generated instructions for execution locally. When processing and generation is to be performed locally, the above-described modules, engines, program logic sequences, and/or the like may be performed in connection with the processing resources local to the computing platform.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of automating execution, on a computing platform, of digitized natural-language instructions provided in a video, the computing platform comprising processing resources including at least one processor and a memory, the method comprising:
developing a script from audio provided in the video;
extracting text shown visually in frames of the video;
identifying simulated user interaction events present in the video;
generating a timeline representation that includes entries for elements of the developed script, elements of the extracted text, and identified simulated user interaction events, wherein like elements of the developed script, elements of the extracted text, and/or identified simulated user interaction events are collected into common or linked entries in the timeline representation;
converting entries in the timeline to corresponding user action command representations;
mapping each user action command representation to a computing platform executable command, wherein elements of the developed script and/or elements of the extracted text are used as parameters for at least one of the corresponding user action command representations; and
storing to a data store for subsequent execution each computing platform executable command using the processing resources of the computing platform, at least some of the computing platform executable commands being executable automatically and without user intervention.

2. The method of claim 1, wherein each simulated user interaction event is identified as having a type belonging to a group of predefined user interaction event types, the group including click and double-click types.

3. The method of claim 1, wherein user action prompts are provided for suspected download and run operations.

4. The method of claim 1, wherein execution of the computing platform executable commands is attempted in an order corresponding to counterpart entries in the timeline representation.

5. The method of claim 4, further comprising pausing the attempted execution of the computing platform executable commands until completion of a currently executing computing platform executable command is detected.

6. The method of claim 5, wherein completion is detected based on a change in modal window status, a change in window focus, and/or an expected file and/or file location being created.

7. The method of claim 1, wherein at least some user action command representations have metadata associated therewith.

8. The method of claim 7, wherein the metadata indicates a file location, filename, and/or one or more arguments or argument representations to be passed to an operating system independent command.

9. The method of claim 8, wherein the metadata is retrievable from a file accessible via the computing platform.

10. The method of claim 1, wherein the mapping of each user action command representation into a computing platform executable command includes translating an operating system non-specific command into a command type suitable for execution by the processing resources of the computing platform.

11. The method of claim 1, further comprising prompting for a human-machine interaction upon an unsuccessful attempt to automatically execute a given computing platform executable command.

12. The method of claim 1, wherein each entry in the timeline representation represents a single semantic concept.

13. The method of claim 1, wherein the video is from a prerecorded video file.

14. The method of claim 1, wherein the video is streaming video.

15. The method of claim 1, further comprising identifying each entry in the script that lacks an associated simulated user interaction event but nonetheless is likely to involve a user action prompt, wherein the conversion is performed for (a) each entry in the timeline that has an associated identified simulated user interaction event, and (b) each entry identified as likely to involve a user action prompt.

16. The method of claim 15, further comprising filtering the timeline representation to remove those entries that neither have an associated identified simulated user interaction event, nor are identified as being likely to involve a user action prompt.

17. A non-transitory computer-readable storage medium tangibly storing a program that includes instructions executable by at least one processor of a computing system to perform the method of claim 1.

18. A computing platform, comprising:
at least one data store; and
processing resources including at least one processor and a memory, the processing resources being configured to run an operating system and execute instructions using the operating system;
wherein the processing resources are configured to control the computing platform to at least:
develop a script from audio provided in the video;
extract text shown visually in frames of the video;
identify simulated user interaction events present in the video;
generate a timeline representation that includes entries for elements of the developed script, elements of the extracted text, and identified simulated user interaction events, wherein like elements of the developed script, elements of the extracted text, and/or identified simulated user interaction events are collected into common or linked entries in the timeline representation;
convert entries in the timeline to corresponding user action command representations;
map each user action command representation to a computing platform executable command, wherein elements of the developed script and/or elements of the extracted text are used as parameters for at least one of the corresponding user action command representations; and
store, to the data store, an ordered listing of each computing platform executable command, the computing platform executable commands being executable at least in part in a computing environment, automatically and without user intervention.

19. The computing platform of claim 18, wherein the computing environment is hosted thereon.

20. The computing platform of claim 18, wherein the processing resources are further configured to control the computing platform to at least identify each entry in the script that lacks an associated simulated user interaction event but nonetheless is likely to involve a user action prompt, and
wherein the conversion is performed for (a) each entry in the timeline that has an associated identified simulated user interaction event, and (b) each entry identified as likely to involve a user action prompt.

21. The computing platform of claim 18, wherein the computing platform executable commands are computer-implementable instructions;
wherein the text is extracted, and the script is developed, by at least:
having the video as audiovisual input corresponding to an instructions model from which the computer-implementable instructions are to be generated, the instructions model having semantic concepts that are summarized therein and are translatable into the computer-implementable instructions but that follow a natural language pattern and include visual cues rather than an input pattern expected by a formalized computer command language;
recognizing the semantic concepts included in the instructions model, the recognizing including a plurality of different identification levels, the different identification levels respectively corresponding to recognitions of semantic concepts in the instructions model including (a) objects, (b) actions for at least some of the recognized objects, and (c) metadata for at least some of the recognized objects, wherein at least some of the semantic concepts are recognizable in connection with a grammar that includes possible semantic concepts that are relevant to interactions that can be taken in connection with a computing platform but that are computing platform independent; and
generating a digitized version of the instructions model by organizing results of the recognitions; and
wherein the digitized version of the instructions model are transformed into the set of computer-implementable instructions operable in the computing environment in accordance with a set of rules defining relationships between elements in the digitized version of the instructions model and the formalized computer command language.

22. A method of automating execution, on a computing platform, of digitized natural-language instructions provided in a video, the computing platform comprising processing resources including at least one processor and a memory, the method comprising:
retrieving, from a data store, computing platform executable commands that have been stored thereto after:
a script is developed from audio provided in the video;
text shown visually in frames of the video is extracted;
simulated user interaction events present in the video are identified;
a timeline representation is generated, the timeline representation including entries for elements of the developed script, elements of the extracted text, and identified simulated user interaction events, wherein like elements of the developed script, elements of the extracted text, and/or identified simulated user interaction events are collected into common or linked entries in the timeline representation;
entries in the timeline are converted to corresponding user action command representations;
each user action command representation is mapped to a computing platform executable command, wherein elements of the developed script and/or elements of the extracted text are used as parameters for at least one of the corresponding user action command representations; and
each computing platform executable command is stored to the data store, at least some of the computing platform executable commands being executable automatically and without user intervention; and
attempting to execute the retrieved computing platform executable commands, automatically and without user intervention.

* * * * *